(12) United States Patent
Heim

(10) Patent No.: US 7,914,143 B2
(45) Date of Patent: Mar. 29, 2011

(54) INTERCHANGEABLE CHARM SYSTEM FOR GLASSES

(76) Inventor: Francie Heim, Shingle Springs, CA (US)

( * ) Notice: Subject to any disclaimer, the term of this patent is extended or adjusted under 35 U.S.C. 154(b) by 0 days.

(21) Appl. No.: 12/250,277

(22) Filed: Oct. 13, 2008

(65) Prior Publication Data
US 2009/0096982 A1    Apr. 16, 2009

Related U.S. Application Data

(60) Provisional application No. 60/998,798, filed on Oct. 13, 2007.

(51) Int. Cl.
*G02C 11/02* (2006.01)
(52) U.S. Cl. ............................ 351/52; 351/51
(58) Field of Classification Search ............. 351/51, 351/121, 111, 158, 41, 52, 47
See application file for complete search history.

(56) References Cited

U.S. PATENT DOCUMENTS

| 2,752,764 | A  | * | 7/1956  | Lederer ......................... 63/29.1 |
| 6,331,057 | B1 | * | 12/2001 | Strube ............................ 351/47 |
| 2007/0273823 | A1 | * | 11/2007 | Lee et al. ...................... 351/52 |
| 2008/0259269 | A1 | * | 10/2008 | Grogan et al. ................. 351/52 |

* cited by examiner

*Primary Examiner* — Hung X Dang
(74) *Attorney, Agent, or Firm* — Temmerman Law Office; Mathew J. Temmerman

(57) ABSTRACT

Glasses for receiving interchangeable charms are disclosed. The glasses are adaptable for releasably and interchangeably attaching and securing a variety of charms such that the plane of the backside of the charm is flush against a convex or smooth outwardly facing surface on a pair of glasses. In a preferred embodiment, the glasses in the present invention comprise a depressed region further comprising a planar magnetic base surrounded on all sides by walls substantially perpendicular thereto. Each charm in the present invention has a second magnet adapted for tight fitment into said depressed region, so as to be held in place by magnetic attraction when brought into close proximity with said depressed region.

3 Claims, 3 Drawing Sheets

INTERCHANGEABLE CHARM SYSTEM FOR GLASSES

RELATED APPLICATIONS

This application is related to previously filed U.S. provisional patent application Ser. No. 60/998,798, filed Oct. 13, 2007, entitled "Magnetically affixed sunglasses charms system", which is incorporated by reference herein as if set out in full.

BACKGROUND

1. Field of the Invention

The present invention relates to eyewear, particularly to a system for releasably affixing a plurality of charms to modified eyewear.

2. Background of the Invention

Many women in today's society enjoy the individuality and expression that is brought about through the use of small charms, commonly draped or fastened about the wrist, ankle, neck, or other appendage of a person to accessorize that person's appearance. One popular example of such an accessory is the bracelet with customizable links. One drawback to the bracelets is the effort that must be expended when the wearer desires to customize or swap out a link. In order to do so, the bracelet must be disassembled from its loop configuration, and reassembled. This can be difficult because as the bracelet is normally worn on a person's wrist, it is generally necessary for the person wearing it to be able to release or open the closing or locking mechanism with one hand. There is no simple way to instantly swap just one charm for another. The popularity of charm bracelets has been decreasing in recent years, due to the above, due to the fact that bracelets may snag or become caught in furniture, machinery etc., and simply due to changing tastes.

Such bracelets were popular for the same reason that other customizable jewelry systems have been popular. That is, because they allowed the wearers to individually express themselves. Because of this, a large market for custom charms has developed. Paralleling the popularity of charms, women who buy reading glasses often prefer to own multiple pairs of glasses in many colors and styles such that the glasses can better accessorize their clothes.

Dating back to 1957, U.S. Pat. No. 2,797,561 to Vaughn discloses an "earring with hook for removably attaching a pendant ornament". The earring includes a hook and a retaining plate, the lower portion of which is biased by a spring 40 toward the hook to retain an ornament on the hook. While pendants may be interchangeably attached to the Vaughn earring, the structure includes a number of generally delicate, fragile and even potentially dangerous parts, such as a hook, retaining plate and spring. These parts project forwardly 45 from the ear of the wearer and may inadvertently snag various objects or become entangled with the wearer's hair. In addition to being fragile, these parts detract from the appearance of the earring while increasing its cost of manufacture and risk of injury to the wearer.

U.S. Pat. No. 4,803,852 to Waldron, discloses an earring device for suspending a variety of interchangeable charms or the like therefrom. The earring comprises a loop member with mechanisms for attachment to an ear and a generally narrow eyelet adapted for allowing a link of a charm to be pulled therethrough to attach or detach the charm to the earring.

U.S. Pat. No. 7,222,503, to Golove, discloses an item of jewelry including a finger ring having a removable setting and a charm coupled to a short chain, which is captured on the ring by the setting. Generally, all interchangeable charm systems have been based on interchangeably changing out charms that are attached to jewelry. Individuals who would prefer to keep their jewelry separate from their the charms will find a lack of options. For instance, no system exists to releasably attach a variety of interchangeable charms to a single pair of glasses.

It is thus an objective of the present invention to provide a magnetic charm system adapted for releasably and interchangeably attaching and securing a variety of charms to a pair of glasses such that the plane of the backside of the charm is flush against a smooth surface of the glasses.

It is a further objective of the present invention to provide a customized charm system that allows the wearer to express herself individually through a charm that does not interfere with the workplace or other activities.

It is a further objective of the present invention to provide a charm for a wearer that is positioned in a fixed relative location so as not to become caught or snagged on furniture, machinery, etc.

It is a further objective of the present invention to provide an interchangeable charm system for use with reading glasses, sun glasses, prescription glasses, as well as a means for modifying any glasses for use with the system.

It is a further objective of the present invention to provide the above described interchangeable charm system wherein said charms are of simple and durable construction yet aesthetically pleasing.

Additional objects and advantages of the present invention will become obvious to the reader and it is intended that these objects and advantages be within the scope of the present invention.

SUMMARY OF THE INVENTION

In accordance with a preferred embodiment, a magnetic charm system is provided adaptable for releasably and interchangeably attaching and securing a variety of charms such that the plane of the backside of the charm is flush against a convex and smooth surface on a pair of glasses. Stated generally, the present invention includes glasses comprising a depressed region further comprising a planar magnetic base surrounded on all sides by walls substantially perpendicular thereto. Each charm in the present invention has a second magnet adapted for tight fitment into said depressed region, so as to be held in place by magnetic attraction when brought into close proximity with said depressed region.

BRIEF DESCRIPTION OF THE FIGURES

The foregoing aspects and many of the attendant advantages of the invention will become more readily appreciated as the same becomes better understood by reference to the following detailed description, when taken in conjunction with the accompanying drawings, wherein.

DETAILED DESCRIPTION OF THE INVENTION

The following description is presented to enable a person of ordinary skill in the art to make and use various aspects and examples of the present invention. Descriptions of specific materials, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described and shown, but is to be accorded the scope consistent with the appended claims.

Figure 1:
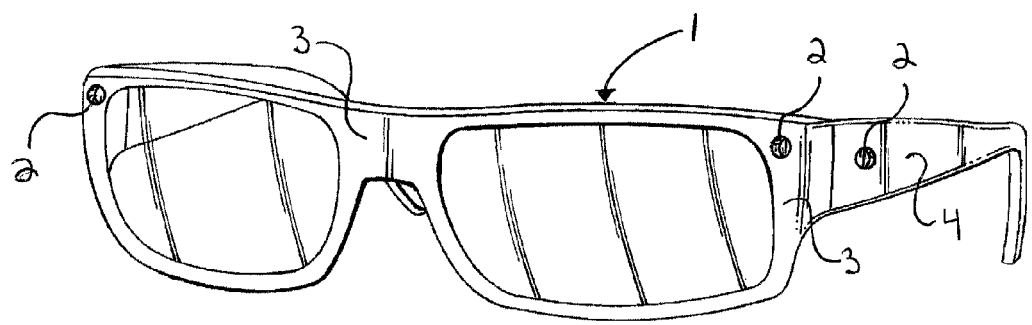
FIG. 1 is a perspective view of an exemplary and preferred embodiment of the present invention.

The present invention is a system providing a modified pair of sunglasses and a plurality of charms attachable thereto. In accordance with a preferred embodiment, and referring now to FIG. 1, a magnetic charm system 1 is provided. The system comprises a pair of glasses, comprising at least one cavity 2, said cavity being depicted in FIG. 1 in three different places.

Figure 2:
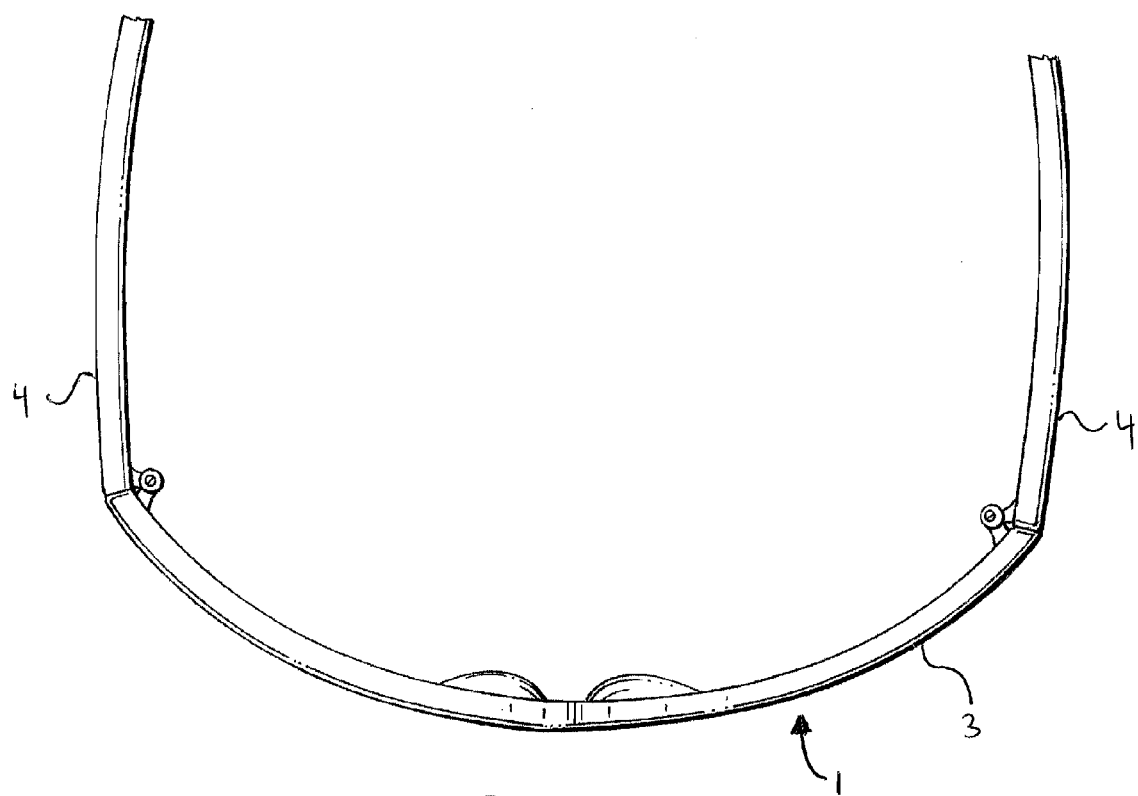
FIG. 2 is a top plan view of the preferred embodiment of the present invention.

As seen in FIG. 2, the cavities 2 do not contain a ridge, and hence do not create a raised profile when viewed from the side. Returning to FIG. 1, the cavities 2 are placed both on the smooth convex face 3 of the glasses, or on the smooth flat side 4 of the glasses. In an alternative embodiment of the invention, fewer than all cavities shown in the Figures are present, however, in every alternative there is at least one cavity. Convex face 3 and flat side 4 are depicted again in FIG. 2.

Figure 3:
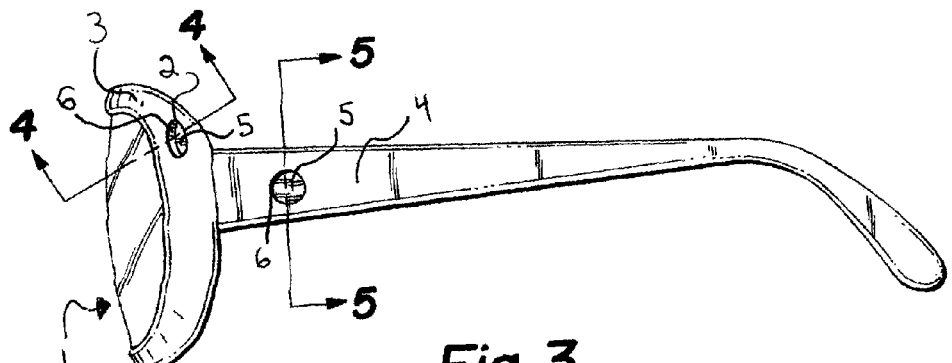
FIG. 3 is side plan view of the preferred embodiment of the present invention.

Turning now to FIG. 3 two cavities are shown wherein the sides and bottom of the cavity are more readily visible. The bottom of each cavity is in a preferred example are substantially planar and comprise a first magnet 5. Surrounding first magnet 5 are glasses magnet sidewalls 6 to said cavity. Glasses magnet sidewalls 6 are preferably perpendicular to said first magnet 5, as shown best in cavity 2 through which cutline 4-4 is taken.

Figure 4:
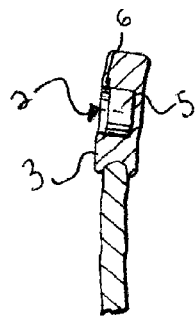
FIG. 4 is a cross sectional view taken along cutline 4-4 in FIG. 3.

FIG. 4, which shows cutline 4-4 in detail, allows said perpendicular sidewalls to more easily be seen. Glasses magnet sidewalls 6 form cavity 2, which in the example shown in FIG. 4 is within convex face 3. The thickness of first magnet 5 is also shown in the cross-sectional view.

Figure 5:
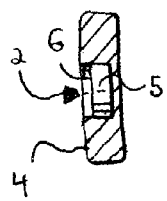
FIG. 5 is a cross sectional view taken along cut line 5-5 in FIG. 3.

FIG. 5 shows similar elements to those shown in FIG. 4, specifically, glasses magnet sidewall 6 is again shown in substantially perpendicular configuration to first magnet 5 and forming cavity 2. In this case, the cross-sectional view is taken along the side of the glasses, and hence flat side 4 is appropriately labeled.

Figure 6:
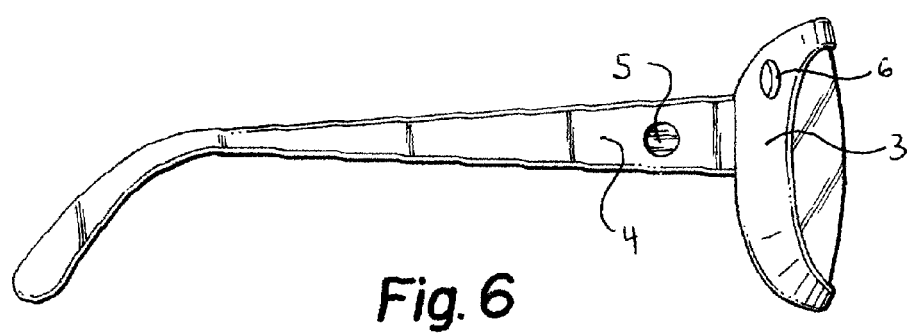
FIG. 6 is right side view of the preferred embodiment of the present invention.

For ease of understanding, FIG. 6 is depicts fewer labels, however, all numbered elements correspond to the labels used in all other Figs.

Figure 7:
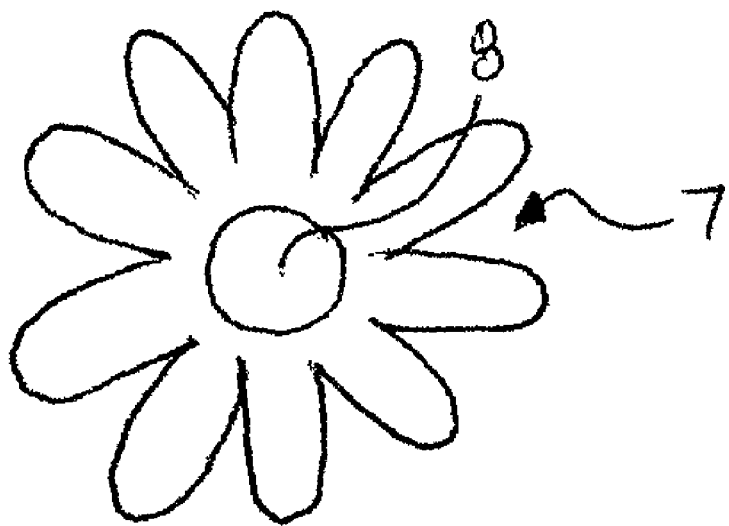
FIG. 7 is a bottom planar view of a charm adaptable to the glasses of the present invention.

FIG. 7 depicts a sample charm in the shape of a flower. Here, second magnet 8 is depicted from an upper plane view. This front side of the charm is not shown as it is the more decorative side of the charm, but does not contain functional elements material to the invention. In this embodiment, magnet 7 would be concealed from view when looking at the charm from the side opposite the magnet. (not shown).

Figure 8:
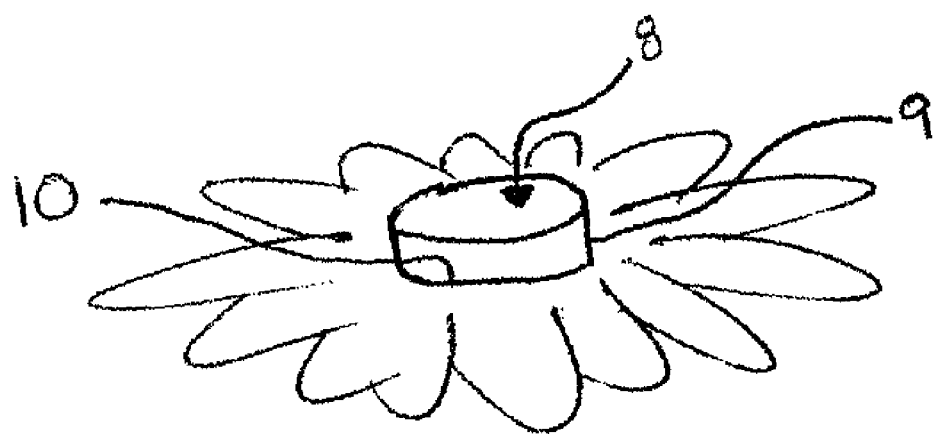
FIG. 8 is a perspective view of said charm adaptable to the glasses of the present invention.

FIG. 8 shows the elevation of second magnet 8. Second magnet 8 in this exemplary embodiment comprises charm magnet sidewalls 9 substantially perpendicular to the top surface (not labeled) of second magnet 8. The bottom of second magnet 8, here labeled as bottom portion 10, is flush with the backside of the decorative portion of the charm.

In use, the size of second magnet 8 is specifically intended to be substantially similar to the size of cavity 2, so it can be matingly attached thereto. Like glasses magnet sidewall 6, charm magnet sidewalls 9 are substantially perpendicular to first magnet 5 when second magnet 8 is inserted in cavity 2. Furthermore, in this case cavity 2 is shown being roughly circle-shaped, and likewise, second magnet 8 is shown substantially circle-shaped. Because of the tight fit relationship of the two elements, they will always be similar. That is, if as in an alternative embodiment of the invention cavity is triangular shaped, then second magnet in that case is triangular shaped. This ensures the two are always capable of being mated together.

Once mated together, the magnetic attractive forces hold charm 7 tightly against magnetic charm system 1. Normally, opposite poles of said magnets will be facing each other. That is, if first magnet 5 has its north pole face exposed outwards (see FIG. 6), then second magnet 8 has its south pole face exposed outwards (see FIG. 7). Thus the force between the two is attractive rather than repulsive.

Finally, it is noted that as shown best in FIG. 6, the cavities 2 are within either flat side 4 or convex face 3. Both flat side 4 and convex face 3 are relatively smooth. In a preferred embodiment, when second magnet 8 is inserted into cavity 2, all parts of charm magnet sidewalls 9 are in contact with glasses magnet sidewall 6. This puts the charm in a flush position against either flat side 4 or convex face 3.

In the preferred embodiment of the invention the magnets are attached as shown in the figures, however, in an alternative exemplary embodiment one magnet could be glued or otherwise affixed to the lens of the glasses. For instance, in one alternative embodiment a magnet is glued to the inside portion of the lens (facing the eye of the wearer). In this instance, a charm comprising a magnet can be affixed to the outside portion of the lens (facing away from the eye of the wearer) by the magnetic field (travelling through the lens) from the magnet glued to the inside portion of the lens. In this modified embodiment, it is envisioned that the end user may buy a kit including the charms, the magnet, and the glue for affixing one magnet to the inside portion of the lens.

In a preferred embodiment of the invention the magnets used are small but powerful, such as Neodymium-iron-boron (NIB) magnets or similar. Furthermore, in another alternative embodiments of the invention the magnets are nickel coated, or coated with some other protectorate so as to prevent chipping or corrosion of the magnet. Finally, in yet an additional alternative embodiment of the invention, one of the two magnets that come in contact with one another as the charm is attached to the glasses is replaced with a magnetic material. Because the magnet will be attracted to the magnetic material, the function of the device is similar in this alternative embodiment, although the magnetic attraction will not be as strong.

In use, the system allows for charms (preassembled with magnets affixed thereto) to be releasably and interchangeably attached and secured against the either the flat sides or convex front of a pair of glasses. At the whim of the user, the charms may be removed from the glasses by hand, and other charms can be affixed in their place. Through this method, multiple different charms can be affixed to the glasses at different times, depending on the mood or inclination of the user.

As mentioned above, women who buy reading glasses are very much into owning multiple pairs of glasses in many colors and styles and using the glasses to accessorize their clothes. The interchangeable charm system described herein gives women the ability to modify a single pair of glasses to match their mood, the holiday season, or the outfit of the day.

With respect to the above description then, it is to be realized that material disclosed in the applicant's drawings and description may be modified in certain ways while still producing the same result claimed by the applicant. Such variations are deemed readily apparent and obvious to one skilled in the art, and all equivalent relationships to those illustrated in the drawings and equations and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact disclosure shown and described, and accordingly, all suitable modifications and equivalents may be resorted to, falling within the scope of the invention.

I claim:

1. Glasses for attaching a variety of charms thereto, the glasses comprising:
   a. a depressed cylindrical region comprising a planar magnetic base and walls surrounding and substantially perpendicular to said planar magnetic base;
      i. wherein said planar magnetic base comprises a first magnet;
      ii. wherein said depressed region is adapted for fitment of a cylindrical second magnet and said second cylindrical magnet is attached to a charm.

2. A magnetic charm system comprising:
   a. glasses having at least one smooth surface that is convex in shape;
   b. said glasses having a first material attached thereto, said first material recessed in a cavity in said at least one smooth surface;
   c. a charm with a second material attached thereto, said second material sized for tight fitment in said cavity such that one side of said charm is flush with said at least one smooth surface;
   d. wherein an attractive magnetic force urges said first material toward said second material; and
   e. wherein said cavity is a cylindrical mold and said second material is a cylindrical protrusion for fitment into said mold, and wherein said mold is cylindrical and wherein said protrusion is cylindrical.

3. A method of decorating glasses, the method comprising the steps of:
   a. providing glasses having at least one smooth surface that is convex in shape, said glasses having a first material attached thereto, said first material recessed in a cavity in said at least one smooth surface;
   b. inserting a second material sized for tight fitment into said first cavity, wherein said second material is attached to a decorative charm, and wherein an attractive magnetic force urges said first material toward said second material such that a side of said decorative charm is substantially flush with said at least one smooth surface, and wherein said cavity is a cylindrical mold and said second material is a protrusion for fitment into said mold, and wherein said mold is cylindrical and wherein said protrusion is cylindrical.

* * * * *